US011339259B2

(12) United States Patent
Zeng et al.

(10) Patent No.: US 11,339,259 B2
(45) Date of Patent: May 24, 2022

(54) FACILE METHODS TO MANUFACTURE INTELLIGENT GRAPHENE NANOMATERIALS AND THE USE OF FOR SUPER-LIGHT MACHINE AND VEHICLES

(71) Applicants: Tingying Zeng, Woburn, MA (US); Kevin Zeng Qi, Woburn, MA (US)

(72) Inventors: Tingying Zeng, Woburn, MA (US); Kevin Zeng Qi, Woburn, MA (US)

( * ) Notice: Subject to any disclaimer, the term of this patent is extended or adjusted under 35 U.S.C. 154(b) by 0 days.

(21) Appl. No.: 16/158,814

(22) Filed: Oct. 12, 2018

(65) Prior Publication Data
US 2019/0048161 A1 Feb. 14, 2019

Related U.S. Application Data

(63) Continuation of application No. PCT/US2017/027228, filed on Apr. 12, 2017.
(Continued)

(51) Int. Cl.
*C08J 5/24* (2006.01)
*C08K 3/04* (2006.01)
(Continued)

(52) U.S. Cl.
CPC .............. *C08J 5/24* (2013.01); *B29C 70/345* (2013.01); *C01B 32/15* (2017.08); *C01B 32/182* (2017.08);
(Continued)

(58) Field of Classification Search
CPC .......... C08J 5/24; B29C 70/345; B29C 70/48; B29C 48/05; D01D 5/0069; D01D 13/00; D01D 4/02; D01D 5/003
See application file for complete search history.

(56) References Cited

U.S. PATENT DOCUMENTS

| 3,652,221 A | 3/1972 | Sloka |
| 5,495,979 A | 3/1996 | Sastri |

(Continued)

FOREIGN PATENT DOCUMENTS

| CN | 102464315 | 5/2012 |
| CN | 102588684 | 11/2015 |

(Continued)

OTHER PUBLICATIONS

Cheng, H et al. Graphene fiber: a new material platform for unique applications. NPG Asia Materials, vol. 6, Jul. 8, 2014; abstract; pp. 6-7.

(Continued)

*Primary Examiner* — Philip C Tucker
*Assistant Examiner* — Jimmy R Smith, Jr.
(74) *Attorney, Agent, or Firm* — Lambert Shortell & Connaughton; David J. Connaughton, Jr.; Justin P. Tinger (57) ABSTRACT

This utility invention is to replace some of the parts of current vehicles and robotic machines with intelligent graphene-based fibers and nanocomposites to achieve significantly weight-decreasing and energy-savings. This invention also is related to the formation of new generation vehicles, machine parts including robotics, which include but not limited to all kinds of cars, trailers, trucks, vehicles on roads and in the sky, ships on the ocean, and intelligent robotics for Human, as well as computer parts, bicycles, and sports supplies.

13 Claims, 9 Drawing Sheets

Related U.S. Application Data (60) Provisional application No. 62/321,572, filed on Apr. 12, 2016.

(51) Int. Cl.
| | | |
|---|---|---|
| *C01B 32/184* | (2017.01) | |
| *B29C 70/34* | (2006.01) | |
| *D01F 1/10* | (2006.01) | |
| *B29C 70/48* | (2006.01) | |
| *C08K 7/06* | (2006.01) | |
| *C01B 32/182* | (2017.01) | |
| *C01B 32/15* | (2017.01) | |
| *D01F 9/14* | (2006.01) | |
| *B29K 307/04* | (2006.01) | |
| *B29L 31/30* | (2006.01) | |

(52) U.S. Cl.
CPC ............ *C01B 32/184* (2017.08); *C08K 3/042* (2017.05); *D01F 1/10* (2013.01); *D01F 9/14* (2013.01); *B29C 70/48* (2013.01); *B29K 2307/04* (2013.01); *B29L 2031/30* (2013.01); *C08K 7/06* (2013.01)

(56) References Cited

U.S. PATENT DOCUMENTS

| | | | |
|---|---|---|---|
| 5,705,269 A | 1/1998 | Pimenov | |
| 5,709,774 A | 1/1998 | Naieni | |
| 7,297,368 B2 | 11/2007 | Williams | |
| 8,808,597 B2 | 8/2014 | Wat | |
| 2001/0001687 A1 | 5/2001 | Pokorzynski et al. | |
| 2002/0113335 A1* | 8/2002 | Lobovsky ............... | B82Y 30/00 264/184 |
| 2006/0066201 A1* | 3/2006 | Ra ........................... | H01J 9/025 313/311 |
| 2011/0268647 A1 | 11/2011 | Ivanovici et al. | |
| 2012/0251763 A1* | 10/2012 | Yamamoto ............... | C08J 5/24 428/68 |
| 2013/0102084 A1 | 4/2013 | Loh et al. | |
| 2013/0272950 A1* | 10/2013 | Yun ........................ | B82Y 30/00 423/447.1 |
| 2013/0330477 A1 | 12/2013 | Blair | |
| 2014/0004344 A1* | 1/2014 | Kim ........................ | D01D 1/06 428/367 |
| 2014/0265038 A1 | 9/2014 | Naskar | |
| 2015/0037530 A1 | 2/2015 | Zhamu et al. | |
| 2015/0099185 A1 | 4/2015 | Joo | |
| 2015/0111449 A1 | 4/2015 | Cruz-Silva | |
| 2016/0043384 A1* | 2/2016 | Zhamu ................... | H01M 4/587 429/231.4 |
| 2016/0145772 A1 | 5/2016 | Yoon | |
| 2016/0177050 A1* | 6/2016 | Park ...................... | C08G 18/797 524/424 |
| 2016/0222548 A1* | 8/2016 | Agboh .................... | B29C 48/05 |
| 2016/0347617 A1 | 12/2016 | Zhang | |
| 2017/0226674 A1* | 8/2017 | Jerez ........................ | B32B 5/02 |
| 2017/0241049 A1* | 8/2017 | Zeng ........................ | D01F 1/10 |
| 2018/0272565 A1* | 9/2018 | Zhamu .................. | B29C 70/025 |
| 2018/0362393 A1* | 12/2018 | Bi ........................... | C01B 32/186 |

FOREIGN PATENT DOCUMENTS

| | | |
|---|---|---|
| CN | 102588684 A | 11/2015 |
| KR | 20140036385 A | 3/2014 |
| WO | 2011074437 | 6/2011 |
| WO | 2014037724 | 9/2013 |
| WO | 201509704 | 1/2015 |
| WO | 2015034180 | 3/2015 |
| WO | 2015097047 | 7/2015 |
| WO | 2015097047 A1 | 7/2015 |
| WO | 2015100682 | 7/2015 |
| WO | 2015/120429 | 8/2015 |
| WO | WO-2015120429 A1 * | 8/2015 ............ B33Y 80/00 |
| WO | 2015/163820 | 10/2015 |

OTHER PUBLICATIONS

Li, Y et al. Highly conductive microfiber of graphene oxide template carbonization of nanofibrillated cellulose. Advanced Functional Materials, vol. 24, No. 46, pp. 7366-7372. Dec. 1, 2014; abstract; pp. 7367-7368, 7371.

Deng, C et al. Effects of electrophoretically deposited graphene oxide coatings on interfacial properties of carbon fiber composite. Journal of Materials Science, vol. 50, pp. 5886-5892. Jun. 3, 2015; abstract; p. 5888.

Patent Cooperation Treaty International Search Report—PCT/US17/27228, dated Jul. 6, 2017.

Haven, Paul et al. Fact Sheet—Vehicle Efficiency and Emissions Standards. Environmental and Energy Study Institute. Aug. 26, 2015.

Xu, Y et al. Flexible graphene films via the filtration of water-soluble noncovalent functionalized graphene sheets. Journal of the American Chemical Society. 2008. vol. 130. No. 18; pp. 5856-5857; p. 5856, figure 1.

Patent Cooperation Treaty International Search Report—PCT/US17/27445, dated Jul. 17, 2017.

Non-Final Rejection of U.S. Appl. No. 15/441,972, dated Jan. 29, 2020.

CN 102588684, machine translation, 2015. (Year: 2015).

WO2015097047, machine translation, 2015. (Year: 2015).

Non-Final Rejection of U.S. Appl. No. 16/158,855, dated Jun. 26, 2020.

Non-Final Rejection of U.S. Appl. No. 15/441,972, dated Dec. 28, 2018.

Final Rejection of U.S. Appl. No. 15/441,972, dated Jul. 18, 2019.

* cited by examiner

Figure 6. Graphene-fibers Used for Intelligent Machine Parts

Figure 7 Graphene gel and the cured graphene machine part

FACILE METHODS TO MANUFACTURE INTELLIGENT GRAPHENE NANOMATERIALS AND THE USE OF FOR SUPER-LIGHT MACHINE AND VEHICLES

FIELD OF THE INVENTION

The present invention is mostly related to substitution parts of traditional vehicle parts both running on the roads, in the sky, and on the ocean with graphene-based carbon fibers, intelligent graphene composites, and the use thereof for the method to prepare the parts, which includes molding and smart additive manufacturing 3D printing for the parts and articles to those vehicles and machines.

BACKGROUND

Running most current vehicles on the roads, especially heavy-duty trailers, trains, and trucks, normally involves burning huge amounts of fossil fuels, which leads massive pollution released to the air. This causes air pollution problems, such as PM 2.5, PM 10, and much more in many countries. According to the published report on Aug. 26, 2015 from Environmental and Energy Study Institute (EESI), "transporting people and goods accounts for 1.8 trillion tons, or 27 percent, of U.S. greenhouse gas (GHG) emissions and approximately 70 percent of all U.S. oil use (or about 13.1 million barrels of oil per day, excluding biofuels). With the burning of gasoline and diesel accounting for 59 percent and 24 percent of the transportation sector's emissions, respectively, significant reductions in auto and truck emissions are essential to climate change mitigation efforts." Currently, vehicle fuel efficiency can be as low as only about 40%. An advanced design could increase the efficiency to 80%. Aerodynamics and weight reduction through lighter materials using carbon fiber and lighter metals enables manufacturers to reduce vehicle weight and increase engine efficiency, while maintaining durability and strength. Meanwhile, thinner and smaller wheels and low rolling resistance tires reduce road friction and air drag, increasing fuel mileage.

On the other hand, there are tremendous demands in decreasing weight while maintaining the mechanical strength in the field of automobiles, airplanes, boat, ships in the ocean, and the underdeveloped intelligent robotic human machines, as well as computer and sport parts etc. Manufacturers have begun to use carbon fibers to replace heavy steel plates/boards for trailers and trucks, cars, and the machines mentioned above. Carbon fiber reinforced parts are light, strong and load-bearing, structural parts. Cutting weight from cars is important, as automakers push to hit Corporate Average Fuel Economy standards of more than 54.5 mpg by 2025. Using carbon fibers to replace some parts of traditional trailers have been proved to be able decrease the weight up to 40% of the vehicles. However, currently commercialized carbon fibers normally are made from carbon-rich polymers such as polyacrylonitrile ("PAN") (U.S. Pat. No. 8,808,597, 2014), which are currently very expensive to produce, because it is synthesized from petroleum products through the oil-refining manufacturing process, which has resulted in carbon fiber vehicles being only at early stage marketing concepts. There is an imperative need to find substitutions for PAN or PAN-produced carbon fibers to overcome the significant pollution, high energy-demand, and time-consumption problems that are factors in the conventional carbon fiber production methods.

Our present invention provides an innovative technology in using graphene-based carbon fibers and graphene composites to combine with, or to substitute, the traditional PAN-produced carbon fibers, which can dramatically decrease the manufacture cost.

SUMMARY OF THE INVENTION

The present invention uses graphene-based carbon fibers and graphene-based three dimensional nanostructure composites to flexibly form the parts for vehicles and machines, which are mostly obtained from natural graphite. To achieve certain functions and properties, utilization of nanomaterials such as nanopowder of metal oxides or metal nanowires, and nano-cellulose along with graphene are used to form composite fibers or composite mixtures. Once the fibers are produced, they may be used to form the desired machine parts by either molding with proper resin or by integration with 3D additive manufacturing printing directly. Graphene carbon fibers may be treated by proper annealing in special gases and inert or reduction environment, resulting in high quality intelligent fiber composites, with significantly lower cost throughout the entire process. This facile method innovates the broad formation of large amount of light weight metal composites, and functional nanofibers with proper metal oxide nanophases joined for unique applications. This decreases the carbon fiber costs while enhancing the final products' properties favorably. This invention also produces a large amount of new graphene composites for the creation and enhancement of anti-corrosion platforms, as well as for the enhanced high mechanical properties' body parts for electrical vehicles and machines. This invention represents an opportunity to provide energy savings, greener chemical process manufacturing, and lower the cost for electrical vehicles, parts of airplanes, as well as ships in the ocean.

The present invention works by using one step to form high quality graphene-based molding parts through the use of graphene carbon fibers and nanocomposite materials and their combinations.

The purpose of the invention is to provide a method to manufacture graphene-based parts by using graphene intelligent carbon fibers, or porous three-dimensional graphene based nanocomposite sheets or graphene-nanocomposites suspensions through molding and green chemical 3D additive manufacturing printing process.

Another purpose of the invention is to provide large amounts of designed parts of graphene-based nanocarbon composites for new field applications for intelligent robotic human, trucks, trailers, trains, buses, trams, vans, cars, airplanes, computer cases and mother boards, as well as boats and ships in the ocean, and anti-corrosion pipes for liquids transportation including chemicals and oil-refining pipes.

A further purpose of the invention is to allow for the vehicle parts manufacturing at low temperature, which does not have as much waste and pollution released to the environment as current methods.

Another purpose of the invention is to significantly decrease the required manufacturing time to produce the designed parts.

A further purpose of the invention is to decrease the requirements of equipment for the manufacture of machine parts and articles for vehicles through additive manufacturing 3D printing.

Another purpose of the invention is to produce graphene-based parts or articles that may be created with the addition of other elements or compositions which can be used to create products which have a broad range of unique and enhanced functional properties, such as thermo-conductivity, electric conductivity, resistance to corrosion, and many other properties that will be able to be used to improve electronics, energy efficiency, lower environmental impact, and increased product lifespan.

A further purpose of the invention is to reduce the reliance on oil and petroleum to create carbon fiber.

BRIEF DESCRIPTION OF THE DRAWINGS

The utility method shall be hereby described in detail in the description with reference to the attached drawings, in which.

DETAILED DESCRIPTION OF THE INVENTION

The aforementioned goals are achieved by the present invention using graphene-based carbon fibers, graphene-based porous nanocomposite plates, or graphene-based nanocomposite suspensions for solution printing through additive manufacturing 3D printing technology controlled by computer software, respectively. The following sections give our three approaches to demonstrate our innovative technology for graphene applications to machine and vehicles.

Approach I
Using Graphene-Based Carbon Fibers As Starting Materials

Graphene flake powder or graphene oxide powder is used as graphene material to start this process. Disperse the graphene powder into solvent with the assistant of surfactants, and add a small amount of nanocellulose fibers, polymers, or resins plus additives into the solution under stirring to obtain a uniform viscosity mixture for spinning.

Examples of solvents that may be used in the present invention as noted above and elsewhere herein include, but are not limited to: water, alcohols, acetone, ketones, dimethyl formamide (DMF), ethylene glycol (EG), DMSO, and their co-solvents, but prefer water and alcohols for the green chemical manufacturing.

Examples of polymers that may be used as noted above and elsewhere herein include, but are not limited to: high carbon contented polymers are preferred to be additives, but not limited. Polymers can be such as polyacrylonitrile (PAN), polystyrene, portion of asphalt, epoxy, polycarbonate, and any kinds of celluloses, polyvinyl alcohol (PVA), polyurethane, polyvinyl chloride (PVC), polyethylene (PE), and polyethylene glycol, nylon, polydimethylsiloxane, polyacrylamide, and poly(methyl methacrylate) (PMMA), and the like.

Examples of resins that may be used as noted above and elsewhere herein include, but are not limited to: polyvinyl resin, polyester resin, epoxy, polycarbonate resin, polyurethane resins, silicone resin, poly(methyl methacrylate) resin, and epoxy siloxane resins.

Graphene-based carbon fibers can be prepared using solution spinning though a solution spinning machine like a cotton candy machine. Then, the cotton-candy-made graphene carbon fibers are first treated in reduction/functional gas flow environment for annealing at temperature from 200 to 2000° C., preferring 1800° C. for about 4 hours by programming control. The flow gases could be, but are not limited to methane, benzene, alkanes, and hydrogen, ammonia, and so on. This process is to enhance the carbon fibers' mechanical properties and the surface treatment for functional groups to enhance the interface chemical functional groups formation. In some cases, polymer with functional groups that can form passivation layers on those graphene-based carbon fibers will be employed for the surface treatment.

Graphene fiber sheets can be obtained by placing the treated cotton-candy graphene fibers under vacuum. The graphene carbon fiber sheets can be also prepared from our previous invention in non-provisional U.S. patent application Ser. No. 15/441,972 filed on Feb. 24, 2017. This application Ser. No. 15/441,972 filed on Feb. 24, 2017 is incorporated herein by reference in its entirety and for any and all purposes as if fully set forth herein. Similarly, U.S. provisional application No. 62/322,084 filed on Apr. 13, 2016 is incorporated herein by reference in its entirety and for any and all purposes as if fully set forth herein.

To prepare the graphene-based carbon fibers parts or articles for vehicles and machines, the treated graphene carbon fiber sheets are cut into desired shape and placed in vacuum for molding as desired models. Based on the thickness needs, three to five or more sheets may be stacked together in the models. Then, under vacuum, a resin, such as those discussed above will be injected to wet the entire graphene carbon fiber sheets. The resin may then be cured at about 20 to 400° C., preferring 250° C., the graphene-based carbon fibers part or article is formed, and ready to be used for machines or vehicles. The article has a similar mechanical strength as steel has.

Approach II
Using Graphene Flakes Or Graphene Oxide Flakes As Starting Materials Graphene flake powder or graphene oxide powder is used as graphene material to start this process. Disperse the graphene powder into solvent, such as those discussed above, with the assistance of surfactants, and add a small amount of nanocellulose fibers, polymers, such as those discussed above, or resins, such as the ones noted above, plus additives into the solution under stirring to obtain the uniform viscosity mixture for solution printing. These materials may be similar or the same as the options noted above for Approach 1.

Next, inject the mixed solutions for additive manufacturing 3D printing and print it as inks through nozzles to form the designed parts or articles for robotics, vehicles, tram (e.g. side walls or hoods), and ship parts or electrical cars, airplane, or trains with railway or no track-railway advanced trains (e.g. non-railway track magnetic trains that is under developed in USA). In a particular embodiment, the graphene based carbon fiber material may be formed into a filament for use in a 3D printer. As such, intelligent articles can be constructed by 3D printing using graphene-based composite filament via 3D printers or using non-solvent graphene-epoxy composites for 3D printing using light curing.

Third, after printing, slightly heat the printed wet parts to about 20 to 400° C. (preferring 250° C.), the wet parts become hard due to the curing of the resin from the mixture in the graphene nanocomposites. The formation of 3D networks through chemical bonds after the curing significantly enhances the mechanical strength and other properties. The structures of this type of graphene-based nanocomposites are of three-dimensional chemically bonded networks inside the nanostructures, which makes the composites uniform in molecular level, and crosslinked tightly, mechanical strength that is competed with steel, which are essential to the parts of heavy duty vehicles that ensures its durable and lifespan.

Further, to achieve unexpected new properties, the mixture may further contain small amount of additives such as nanoparticles or nanowires of metal or non-metals, or steel nano-powder, and metal oxide. Examples may include but are not limited to carbon nanotubes, Mg, Al, steel alloy powder, $ZrO_2$, $Fe_3O_4$, or $MoS_2$, $WS_2$, their combination would be used to mix with graphene flakes, proper polymer, and cellulose to form the mixed suspensions before 3D printing.

Examples of the small amount of additives to achieve unique properties of the graphene nanocomposite parts or articles for vehicles may include, but are not limited to: nanoparticles or nanowires of metal or steel nano-powder, and metal oxide, examples are not limited to carbon nanotubes, Mg, Al, steel alloy powder, $ZrO_2$, $Fe_3O_4$, or $MoS_2$, $WS_2$, MgO, $Al_2O_3$, or their combination. These additives may, among other uses, be used to mix with graphene flakes, proper polymer, and nanocellulose to form the mixed suspensions before 3D printing.

Approach III

Using Graphene-Based Porous Nanocomposites As Starting Materials

Based on the processing temperature and additives, different mechanical properties of graphene-based carbon nanoporous composite sheets can be formed through the use of suspensions by adding additional foam-agents to the mixture of Approach II. The porous sheets can be prepared by directly pouring the pore-forming-agent-containing suspensions into a mold, leaving it or heating it from room temperature 20 to 400° C. to form porous sheets, preferring 250° C. The porous sheets are then annealed in inert or flow gases and special reduction gas flow in a temperature range of 400° C. to 2000° C., preferring 1800° C. The prepared graphene porous sheet has high surface area, extremely high tensile and Young's modulus. Pore sizes are in the range of 1 nm to 8 μm.

Examples of the foam/pore forming agent may include but are not limited to any substances generally releasing a gas. These may be an organic polymeric material or an organic small-molecule material having a decomposition temperature lower than 2000° C. or inorganic small molecules; these can include, but are not limited to: colophony, helium, ammonium carbonate, carbon dioxide, tetramethyl ammonium acetate, hydrogen, nitrogen, sodium bicarbonate, ammonium acetate, peroxide, ammonium nitrate, basic cupric carbonate, and the like.

To prepare the graphene-based carbon nanocomposite parts or articles for vehicles and machines, the treated graphene porous carbon sheets are cut into desired shape and placed in vacuum for molding as desired. Based on the thickness needs, three to five or more sheets may be stacked together in the mold. Then, under vacuum, resin, such as those noted above, will be injected to wet the entire graphene carbon fiber sheets. After the resin is cured at room temperature to about 400° C. (preferring 250° C.), the graphene-based carbon fibers part or article is formed, and ready to be used for machines or vehicles. The articles have compete mechanical strength as steel has, light weight as carbon fibers, much lighter than alloy of Al—Mg, and have a variety of unique properties. It has excellent mechanical properties such as strength, and adjustable properties for thermal and electrical conductivities, shielding radiations, and electromagnetic waves, anti-corrosion, and more unique properties.

In summary, our invention leads to large a number of graphene-based nanocomposite parts or articles formed for machines, robotics, airplanes, ships, and vehicles(cars, trucks, trailers, vans etc.) plus tram and trains, which have compete mechanical strength as steel, light weight as carbon fibers, much lighter than alloy of Al—Mg, and have a variety of unique properties. It has excellent mechanical properties such as strength, and adjustable properties for thermal and electrical conductivities, shielding radiations, and electromagnetic waves, anti-corrosion, and more.

Figure 1:
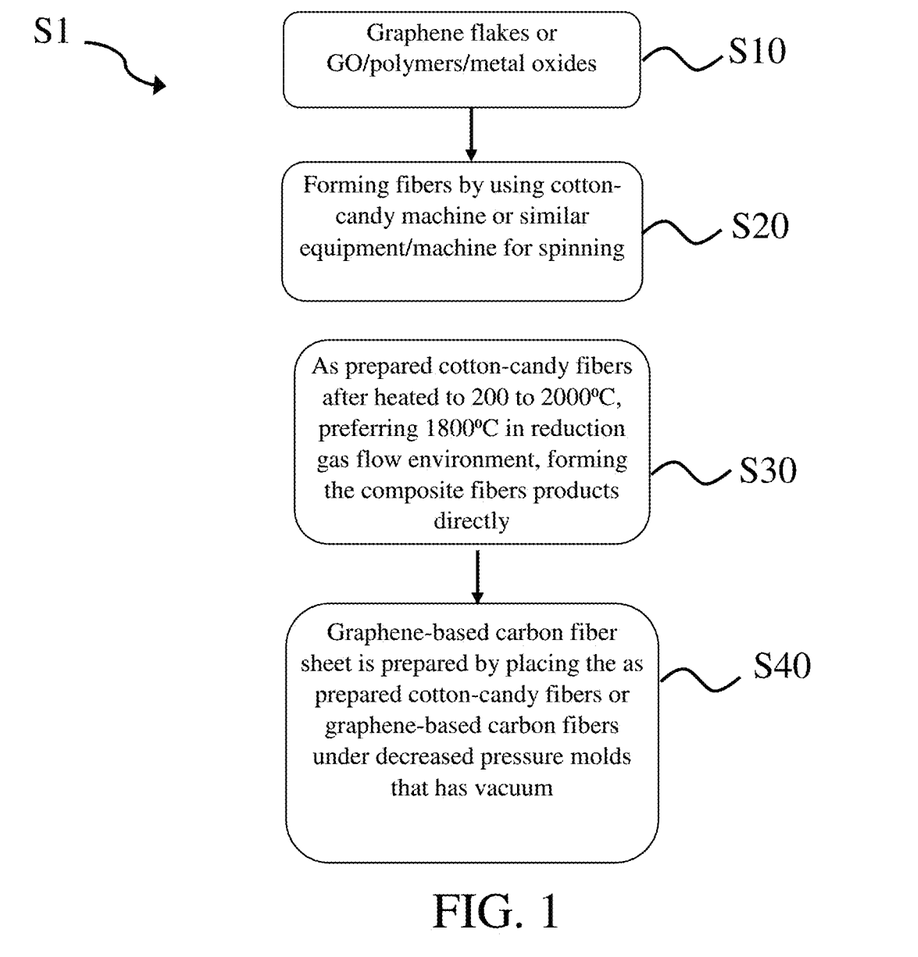
FIG. 1 is a flowchart showing a method of manufacturing graphene-based carbon fibers and its sheets by a "cotton-candy machine" through spinning, according to the present invention.

Referring now to FIG. 1 showing the operational flowchart of the method of manufacturing graphene into carbon fiber according to the present invention. As shown in FIG. 1, the method of the present invention generally comprises the steps of obtaining graphene flakes or graphene oxide S10, forming the fibers via cotton-candy machine or similar setup for spinning S20, and applying a heat treatment between 200° C. to 2000° C., preferring 1800° C. S30. By altering the heat treatment applied, the qualities of the resulting carbon fiber can be manipulated and enhanced; finally graphene-based carbon fiber sheet is prepared by placing the as-prepared graphene carbon fibers in vacuum molds S40.

Figure 2:
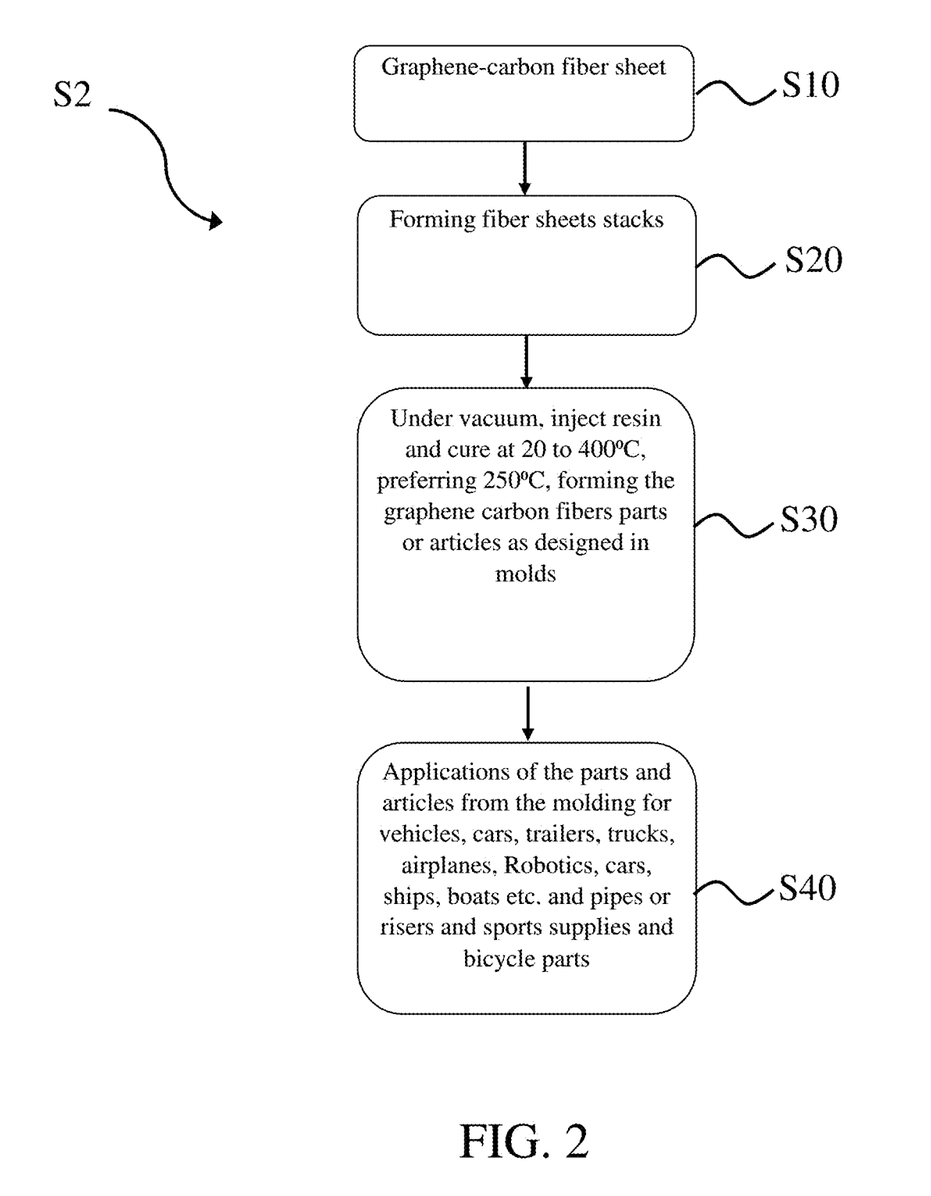
FIG. 2 is a flowchart showing a method of manufacturing graphene carbon fiber-based vehicle parts and articles for robotics and ships through molding

FIG. 2 shows the operational flowchart of the method of manufacturing graphene carbon fiber sheets to form vehicle parts or articles according to the present invention. As shown in FIG. 2, the method of the present invention generally comprises the steps of obtaining graphene carbon fiber sheet in a mold S10, forming the fiber sheet stacks via overlayering them S20, forming the parts or articles by applying vacuum in the mold, injecting resin to cure at 20 to 400° C., preferring 250° C. S30, and applying the parts or articles to the desired vehicles S40. In a preferred embodiment and curing of the present invention the heating process heats the fibers up to 400° C., preferring 250° C. in air S30.

Figure 3:
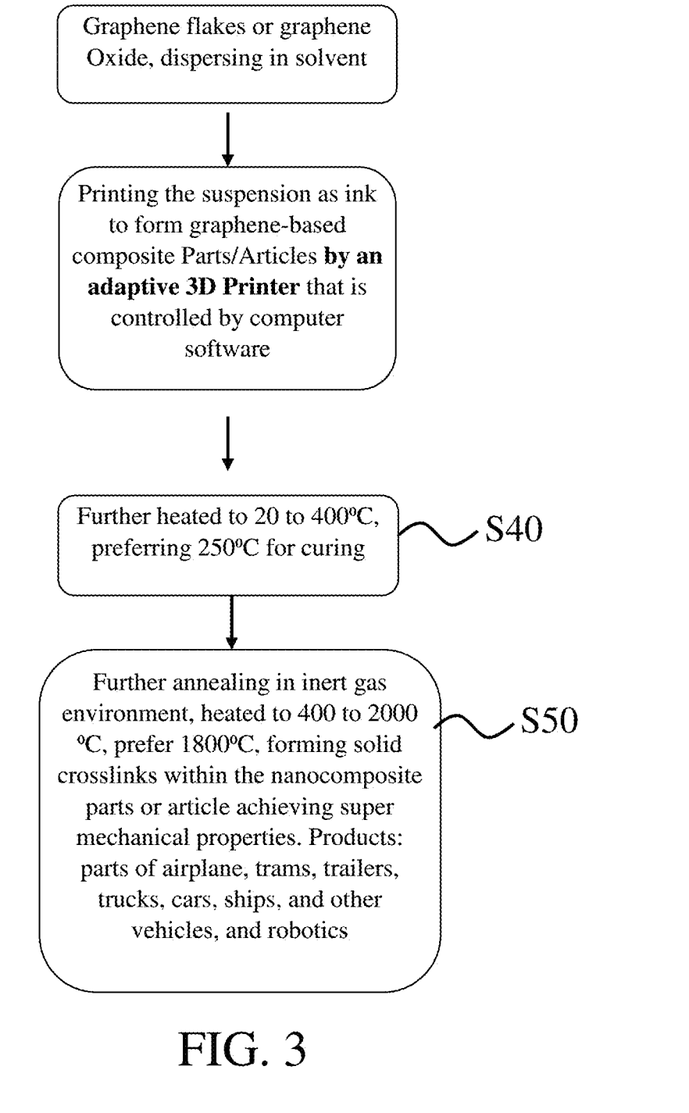
FIG. 3 is a flowchart showing a method of manufacturing graphene-nanocomposite parts or articles by a commercialized additive manufacturing 3D printing machine according to the present invention.

FIG. 3 shows the operational flowchart of the method of manufacturing graphene-based nanocomposite parts or articles through additive manufacturing 3D printing according to the present invention. As shown in FIG. 3, the method of the present invention generally comprises the steps of obtaining graphene flakes or graphene oxide S10, forming the uniform suspension in solvent with small amount resin and other additives S20, applying adaptive 3D printing technology S30 via an Adaptive 3D Printer with digital control through a computer, applying a further heat treatment between 20 to 400° C., preferring 250° C. for curing S40, and applying a further heat treatment heated to 400 to 2000° C., preferring 1800° C. in inert/flow gas environment S50 which results in a further refined and crosslinking formation inside the nanocomposites.

Figure 4:
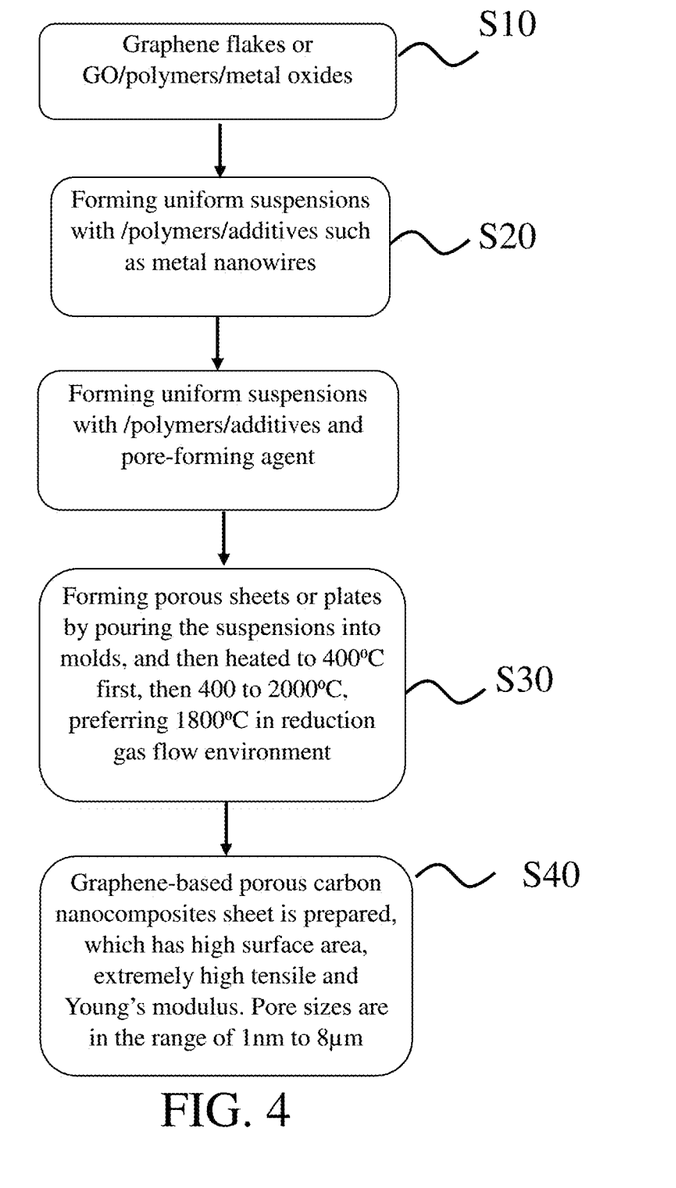
FIG. 4 is a flowchart showing a method of manufacturing porous graphene nanocomposite sheets or plates.

FIG. 4 shows the operational flowchart of the method of manufacturing porous graphene nanocomposite sheets or plates according to the present invention. The method of the present invention generally comprises the steps of obtaining graphene flakes or graphite oxide S10, forming a mixture with additives, polymers and pore-forming agents S20, pouring the suspension into a mold, and applying a heat treatment 400° C. first, then to 2000° C., preferring 1800° C., in a reduction gas flow environment S30. Graphene-based porous carbon nanocomposites sheet is prepared, which has high surface area, extremely high tensile and Young's modulus. Pore sizes are in the range of 1 nm to 8 µm.

Figure 5:
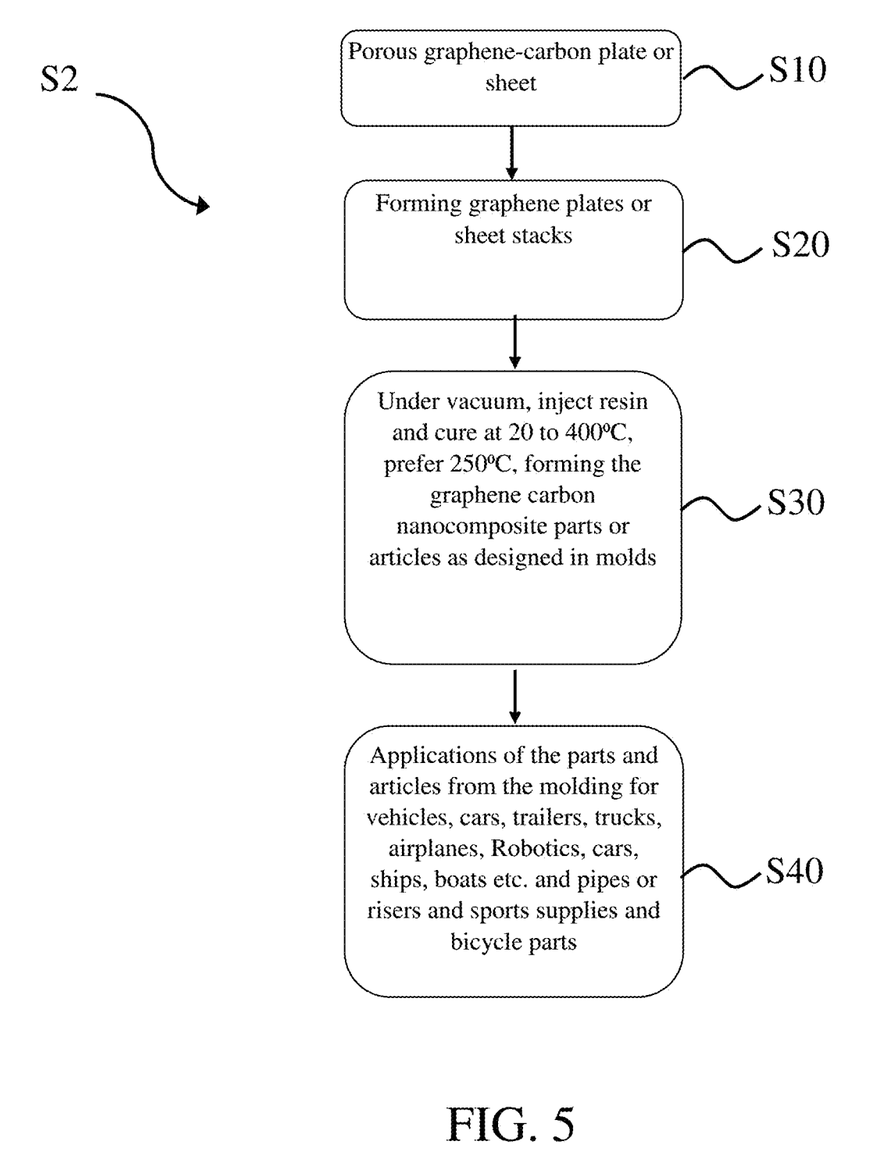
FIG. 5 is a flowchart showing a method of manufacturing graphene-based nanocomposite parts or articles using porous graphene sheets through molding.

As shown in FIG. 5, the method of the present invention generally comprises the steps of applying a porous graphene carbon plate or sheet in a mold S10, forming the plate or sheet stacks via over-layer them S20, forming the parts or articles by applying vacuum in the mold, injecting resin to cure at 20° C. to 400° C., preferring 250° C. S30, and applying the parts or articles to the desired vehicles S40. In a preferred embodiment and curing of the present invention the heating process heats the fibers up to 400° C., preferring 250° C. in air S30.

Figure 6:
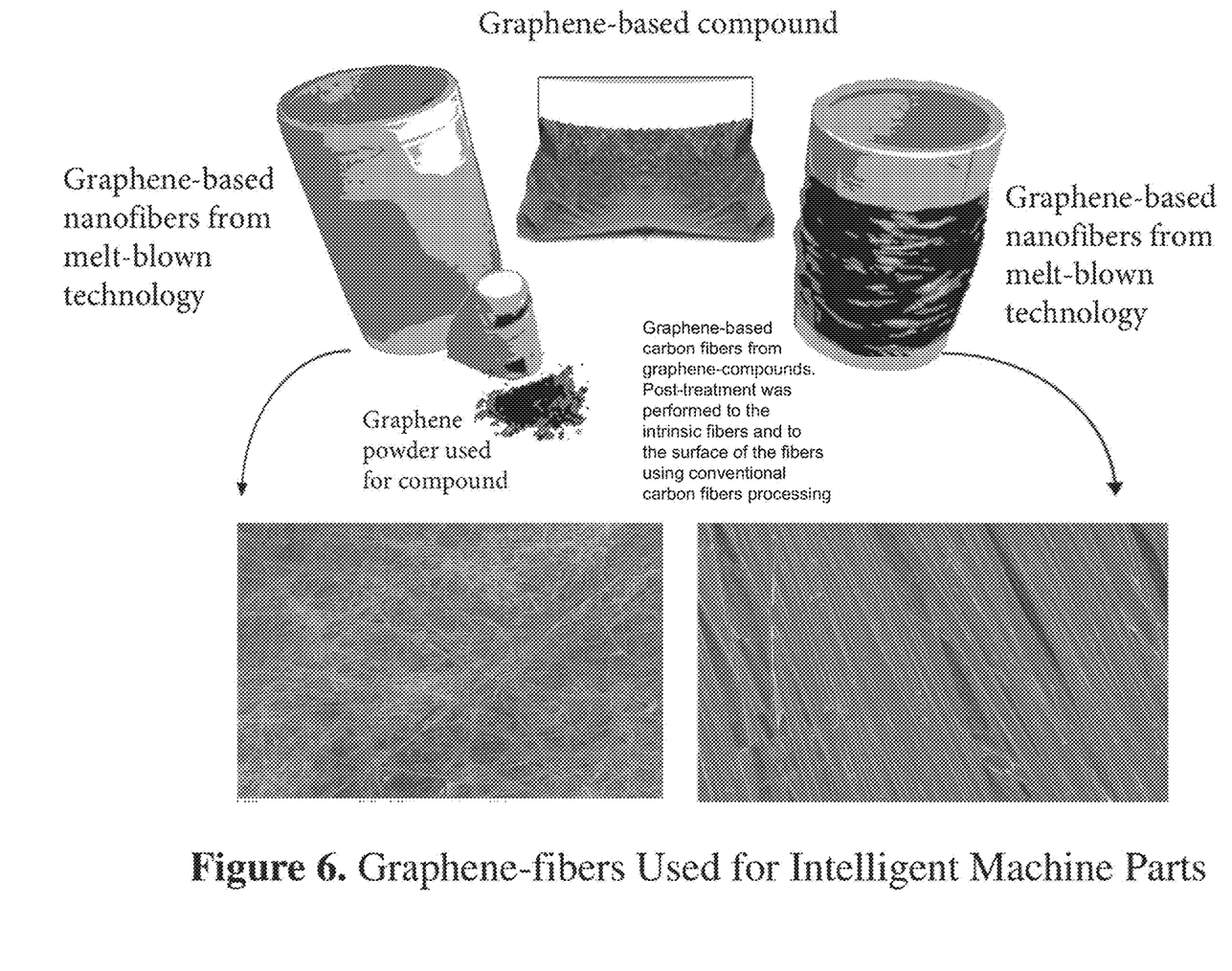
FIG. 6 provides a view of graphene fibers for use in machine parts.

FIG. 6 provides the graphene composite compound pellets and the corresponding graphene-based carbon fibers that can be used to form some intelligent machine parts as it did using PAN conventional carbon fibers. The processing of those fibers have low cost manufacturing compared to PAN carbon fibers. Only intelligent articles from this invention will be selected with its mechanical strength matching aluminum/magnesium (Al—Mg) alloys and some of the parts as the same as steels.

Figure 7:
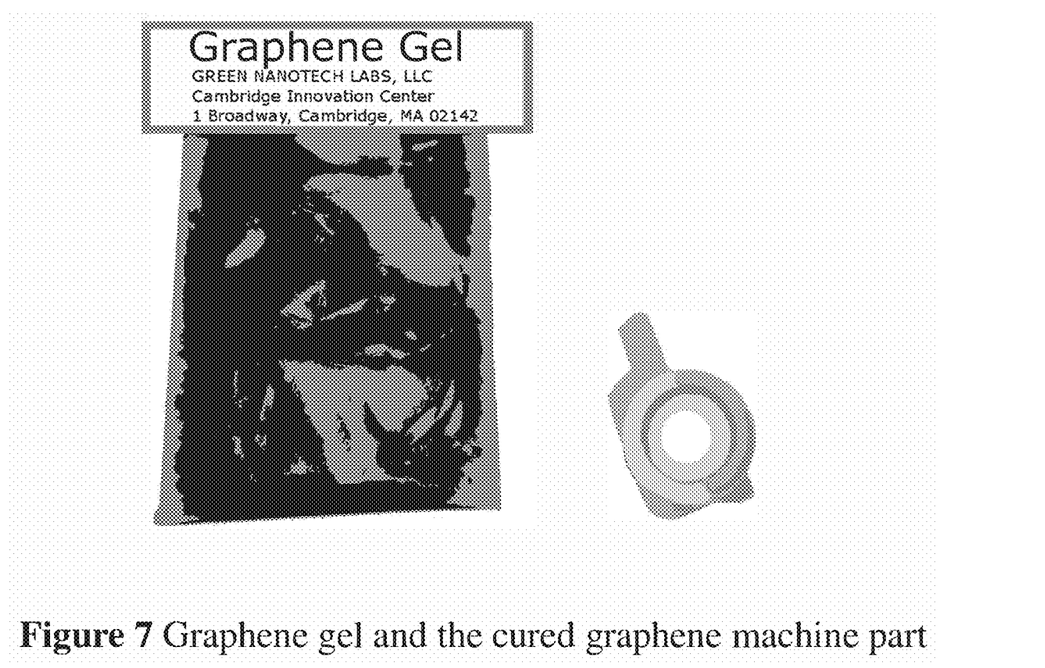
FIG. 7 provides a view of graphene gel and a cured graphene machine part.

FIG. 7 shows the graphene gel that is formed by mixing graphene powder with epoxy. Then at low heating conditions, it is cured by heating and form a machine article with 3D molding. Similar designed articles and processing can be used for intelligent machine or vehicle parts, or liquid transportation pipes such as working in chemical plants and in the ocean to avoid corrosion. Graphene-based composites are excellent for having anti-corrosion properties while maintaining an excellent mechanical properties.

Figure 8:
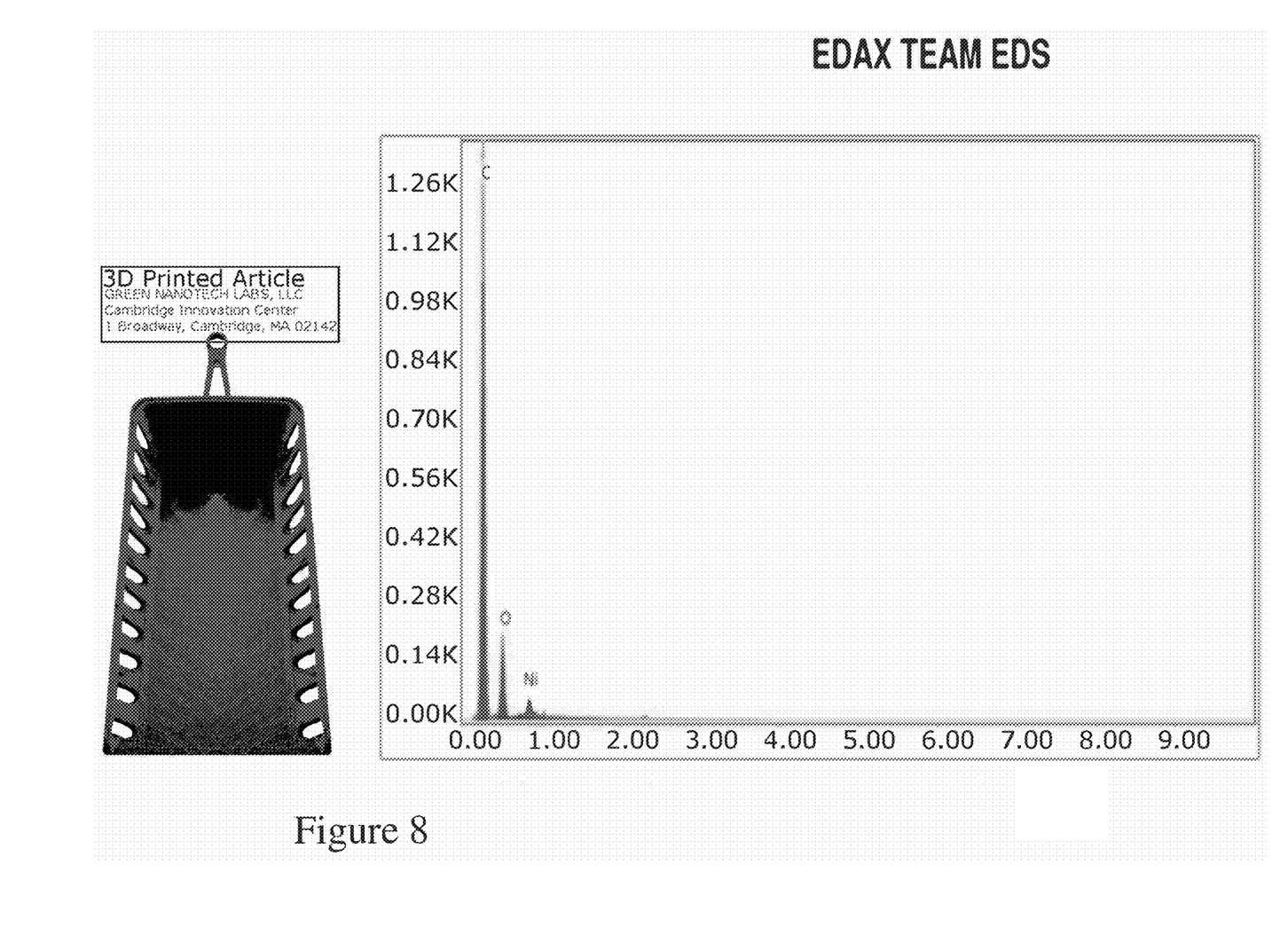
FIG. 8 provides an example of Graphene-based wagon and trolley model: decreasing conventional steel wagon 80% body weight, and printed by graphene filament: C %=82% in atomic percentage.

FIG. 8 shows a 3D printed trolley or wagon models. The 3D printing materials is a graphene-based ABS composite filament. This model has body size of 10 cm×4 cm×2 cm, and thickness of printing is 1 mm, but only weighs 0.5 gram. The same volume size of steel have weight about 30 grams, decreasing 80% of the conventional steel wagon weight.

Figure 9:
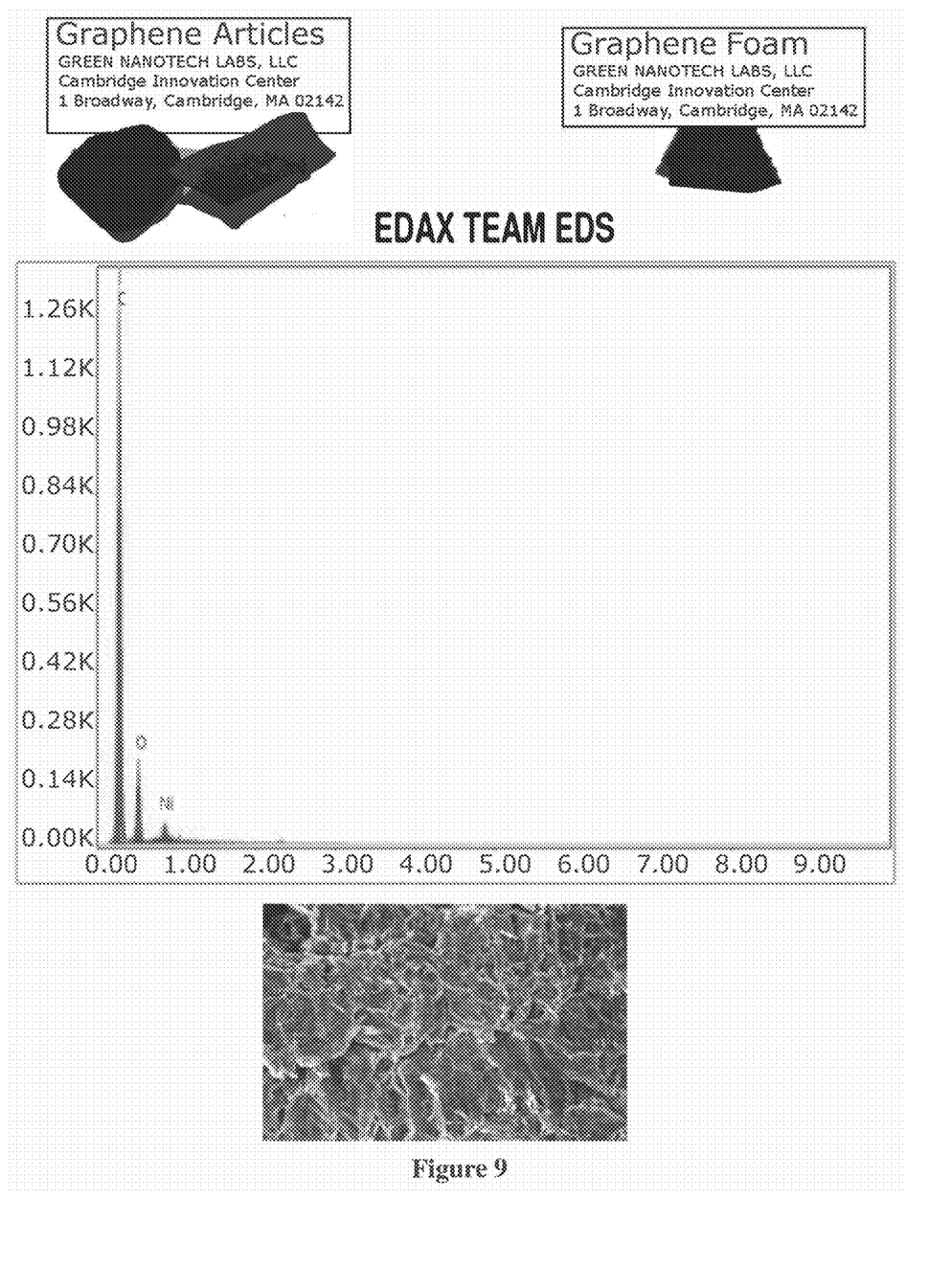
FIG. 9 shows graphene-plastic foams that can be cut into shapes to form intelligent machine parts or articles that lightens the weight of vehicles.

FIG. 9 shows embodiments of components that are produced from this invention through the foaming agent added into graphene gel. Those graphene foams can be cut into a satisfactory shape, and, using epoxy, to make the machine articles formed after cured either by UV light or by heating.

What is claimed is:

1. A method of producing graphene based carbon fiber comprising the steps of:
dispersing a quantity of at least one of a graphene powder, graphene flakes, graphene oxide powder, and graphene oxide flakes into a solvent solution with a surfactant;
adding at least one of a nanocellulose fiber, a polymer, and a resin into the solvent solution with the surfactant to form a mixture comprising the quantity of at least one of the graphene powder, graphene flakes, graphene oxide powder, and graphene oxide flakes, solvent solution with the surfactant and the at least one of the nanocellulose fiber, the polymer, and the resin;
stirring the mixture to obtain a uniform viscosity mixture;
heating the uniform viscosity mixture to a temperature of between 20° to 400° C. to form a plurality of porous carbon fiber sheets, a pore size of the pores being in a range of 1nm to 8 µm; and
annealing the plurality of porous carbon fiber sheets at a temperature of 400° C. to 2000° C. after the heating step.

2. The method of claim 1 wherein the step of forming the plurality of carbon fiber sheets from the uniform viscosity mixture further comprises using a 3D printing machine, the 3D printing machine being computerized, and configured to force the uniform viscosity mixture through a nozzle onto a substrate.

3. The method of claim 2 wherein the forcing of the uniform viscosity mixture through the nozzle forms a graphene-based composite filament.

4. The method of claim 1 wherein the solvent is one of water, an alcohol, acetone, a ketone, dimethyl formamide (DMF), ethylene glycol (EG), and DMSO.

5. The method of claim 1 wherein the adding step comprises adding the polymer to the solvent solution with the surfactant, wherein the polymer is one of polyacrylonitrile (PAN), polystyrene, portion of asphalt, epoxy, polycarbonate, and any kind of cellulose, polyvinyl alcohol (PVA), polyurethane, polyvinyl chloride (PVC), polyethylene (PE), polyethylene glycol, nylon, polydimethylsiloxane, polyacrylamide, and poly(methyl methacrylate) (PMMA).

6. The method of claim 1 wherein the adding step comprises adding the resin to the solvent solution with the surfactant, wherein the resin is one of a polyvinyl resin, polyester resin, epoxy, polycarbonate resin, polyurethane resin, silicone resin, poly(methyl methacrylate) resin, and an epoxy siloxane resin.

7. The method of claim 1 further comprising a step of adding an additive to the solvent solution with the surfactant, the additive being at least one of nanoparticles or nanowires of metal, steel nano-powder, carbon nanotubes, and a metal oxide, and combinations thereof.

8. The method of claim 1 further comprising forming the carbon fibers into the plurality of sheets under a vacuum.

9. The method of forming the plurality of carbon fiber sheets of claim 8 further comprising a step of placing the sheets in a mold; injecting a quantity of second resin into the mold; drawing the vacuum on the sheets and second resin; and curing the second resin at approximately 20° C.-400° C. forming a cured composition, the curing step forming chemical bonds to enhance mechanical strength.

10. The method of forming the plurality of carbon fiber sheets of claim 9 comprising a step of forming the plurality of sheets into a shape of a vehicle body part; and attaching the cured composition to a vehicle.

11. The method of claim 1 further comprising a step of adding a foaming agent to the solvent with the surfactant, the foaming agent being at least one of colophony, helium, ammonium carbonate, carbon dioxide, tetramethyl ammonium acetate, hydrogen, nitrogen, sodium bicarbonate, ammonium acetate, peroxide, ammonium nitrate, and basic cupric carbonate.

12. A method of forming a carbon fiber item using the plurality of carbon fiber sheets formed by the method of claim 1, and further comprising the steps of:
- layering the plurality of sheets;
- applying a second resin to the plurality of sheets; and
- curing the second resin; and
- annealing the cured second resin and plurality of sheets in an inert gas at a temperature of 1800° C.

13. The method of claim 12 further comprising the step of cutting the carbon fiber item to a desired shape after the step of annealing the cured second resin and plurality of sheets.

* * * * *